(12) United States Patent
Tauchi

(10) Patent No.: US 10,099,617 B2
(45) Date of Patent: Oct. 16, 2018

(54) DRIVING ASSISTANCE DEVICE AND DRIVING ASSISTANCE METHOD

(71) Applicant: DENSO CORPORATION, Kariya, Aichi-pref. (JP)

(72) Inventor: Makiko Tauchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 136 days.

(21) Appl. No.: 15/104,935

(22) PCT Filed: Jan. 26, 2015

(86) PCT No.: PCT/JP2015/000324
§ 371 (c)(1),
(2) Date: Jun. 15, 2016

(87) PCT Pub. No.: WO2015/111417
PCT Pub. Date: Jul. 30, 2015

(65) Prior Publication Data
US 2017/0028917 A1     Feb. 2, 2017

(30) Foreign Application Priority Data
Jan. 27, 2014   (JP) ................................ 2014-012868

(51) Int. Cl.
*H04N 7/18* (2006.01)
*B60R 1/00* (2006.01)
(Continued)

(52) U.S. Cl.
CPC ................ *B60R 1/00* (2013.01); *B60K 35/00* (2013.01); *G08G 1/165* (2013.01); *G08G 1/168* (2013.01);
(Continued)

(58) Field of Classification Search
CPC ........ H04N 7/18; H04N 9/47; H04N 5/23293; H04N 5/247; B60R 1/00; B60R 2300/607;
(Continued)

(56) References Cited

U.S. PATENT DOCUMENTS 6,476,855 B1 * 11/2002 Yamamoto ................ B60R 1/00
348/148
6,734,896 B2 * 5/2004 Nobori ...................... B60R 1/00
348/148

(Continued)

FOREIGN PATENT DOCUMENTS

JP          2012175314 A      9/2012

*Primary Examiner* — Trang U Tran
(74) *Attorney, Agent, or Firm* — Harness, Dickey & Pierce, P.L.C.

(57) ABSTRACT

A driving assistance device displaying a condition around a vehicle on a display unit includes: a storage device storing an external shape of the vehicle; an object detection device detecting a position of an object around the vehicle and an external shape of a vehicle side of the object; a movement information acquiring device acquiring movement information relating to a direction and an amount of movement of the vehicle; a relative position estimating device estimating a relative position of the object to the vehicle based on the position of the object and the movement information; an image generating device generating a top-view image of the vehicle and the object viewed from above the vehicle based on the external shape of the vehicle, the external shape of the object, and the relative position of the object to the vehicle; and a display device displaying the top-view image on the display unit.

4 Claims, 9 Drawing Sheets

(51) Int. Cl.
*G08G 1/16* (2006.01)
*B60K 35/00* (2006.01)
*H04N 5/232* (2006.01)
*H04N 5/247* (2006.01)

(52) U.S. Cl.
CPC ......... *H04N 5/23293* (2013.01); *H04N 5/247* (2013.01); *B60K 2350/106* (2013.01); *B60K 2350/1084* (2013.01); *B60R 2300/607* (2013.01); *B60R 2300/802* (2013.01); *B60R 2300/8093* (2013.01); *G06T 2207/30241* (2013.01); *G06T 2207/30261* (2013.01)

(58) Field of Classification Search
CPC ...... B60R 2300/802; B60R 2300/8093; B60K 35/00; B60K 2350/106; B60K 2350/1084; G08G 1/165; G08G 1/168; G06T 2207/30241; G06T 2207/30261
USPC .................................................. 348/148, 149
See application file for complete search history.

(56) References Cited

U.S. PATENT DOCUMENTS

| | | | |
|---|---|---|---|
| 7,176,959 B2 * | 2/2007 | Sato ........................ | G01S 11/12 |
| | | | 348/148 |
| 7,920,056 B2 * | 4/2011 | Hattori ............... | B62D 15/0275 |
| | | | 180/167 |
| 8,988,525 B2 * | 3/2015 | Thompson ................ | B60R 1/00 |
| | | | 348/148 |

* cited by examiner

OBJECT IMAGE

OWN VEHICLE IMAGE

BLIND-SPOT OBJECT DATABASE

| ID | OBJECT IMAGE | RELATIVE POSITION |
|---|---|---|
| 002 | S1 | P1 |
| 004 | S2 | P2 |
| 005 | S3 | P3 |

DRIVING ASSISTANCE DEVICE AND DRIVING ASSISTANCE METHOD

CROSS REFERENCE TO RELATED APPLICATIONS

This application is a U.S. National Phase Application under 35 U.S.C. 371 of International Application No. PCT/JP2015/000324 filed on Jan. 26, 2015 and published in Japanese as WO 2015/111417 A1 on Jul. 30, 2015. This application is based on and claims the benefit of priority from Japanese Patent Application No. 2014-12868 filed on Jan. 27, 2014. The entire disclosures of all of the above applications are incorporated herein by reference.

TECHNICAL FIELD

The present disclosure relates to a technique of displaying conditions around a vehicle on a display unit to assist driving.

BACKGROUND ART

There is known a technique of mounting a camera in a vehicle and photographing conditions around the vehicle to display the positional relation between the vehicle and an object (a guard rail, another vehicle, etc.) present around the vehicle. Since this positional relation is easier to grasp for a driver when viewed from above the vehicle, among techniques as thus described, there is present a technique of displaying an image of the surroundings of the vehicle viewed from above the vehicle.

Naturally, the camera cannot be attached above the vehicle, and hence the image viewed from above the vehicle cannot be directly obtained. Accordingly, in such a technique, the camera is installed as directed from the vehicle to the surroundings of the vehicle and an image, obtained by converting an image photographed by this camera to an image viewed from above the vehicle (viewpoint conversion), is displayed (e.g., Patent Literature 1).

However, when the image photographed by the camera is subjected to the viewpoint conversion, distortion occurs, and the image may thus be displayed with the positional relation between the vehicle and the object being different from the actual one.

PRIOR ART LITERATURES

Patent Literature

Patent Literature 1: JP-2012-175314 A

SUMMARY OF INVENTION

It is an object of the present disclosure to provide a driving assistance device and a driving assistance method for displaying the positional relation between a vehicle and an object with high accuracy.

According to a first aspect of the present disclosure, a driving assistance device mounted on a vehicle and displaying a condition around the vehicle on a display unit includes: a storage device that stores an external shape of the vehicle; an object detection device that detects a position of an object disposed around the vehicle and an external shape of at least a vehicle-facing side of the object; a movement information acquiring device that acquires movement information relating to a direction and an amount of movement of the vehicle; a relative position estimating device that estimates a relative position of the object to the vehicle based on the position of the object acquired in the object detecting device and the movement information acquired in the movement information acquiring device; an image generating device that generates a top-view image of the vehicle and the object viewed from above the vehicle based on the external shape of the vehicle, the external shape of the object, and the relative position of the object to the vehicle; and a display device that displays the top-view image on the display unit.

When an image of an object which is photographed (a photographed image of an object) is displayed, distortion occurs in the image and the positional relation between the vehicle and the object tends to be different from the actual one. In this respect, the above driving assistance device does not display a photographed image, but displays a top-view image generated based on an external shape of the vehicle, an external shape of the object, and a relative position of the object to the vehicle. This prevents occurrence of distortion in the image as in the case of displaying a photographed image, and enables the positional relation between the vehicle and the object to be clearly displayed with high accuracy.

According to a second aspect of the present disclosure, a driving assistance method provided in a vehicle for displaying a condition around the vehicle on a display unit includes: detecting a position of an object disposed around the vehicle, and an external shape of at least a vehicle-facing side of the object; acquiring movement information relating to a direction and an amount of movement of the vehicle; estimating a relative position of the object to the vehicle based on the position of the object and the movement information; generating a top-view image of the vehicle and the object viewed from above the vehicle based on the external shape of the vehicle, the external shape of the object, and the relative position of the object to the vehicle; and displaying the top-view image on the display unit.

In the above driving assistance method, a photographed image is not displayed, but a top-view image is displayed which is generated based on an external shape of the vehicle, an external shape of the object, and a relative position of the object to the vehicle. This prevents occurrence of distortion in the image as in the case of displaying a photographed image, and enables the positional relation between the vehicle and the object to be clearly displayed with high accuracy.

BRIEF DESCRIPTION OF DRAWINGS

The above and other objects, features and advantages of the present disclosure will become more apparent from the following detailed description made with reference to the accompanying drawings. In the drawings:

FIG. 4A shows the state of detecting distances to a plurality of regions of an object (wall), FIG. 4B shows the state of detecting a shape of the object on the vehicle side, and FIG. 4C shows the state of reflecting the detected state to a regulatory image to generate an object image;

FIG. 7A shows the case of displaying a camera image as it is, and FIG. 7B shows the case of performing viewpoint conversion on the camera image and displaying the obtained image;

EMBODIMENTS FOR CARRYING OUT INVENTION

Hereinafter, an embodiment of a driving assistance device will be described in order to clarify contents of the present disclosure described above.

A. Device Configuration

Figure 1:
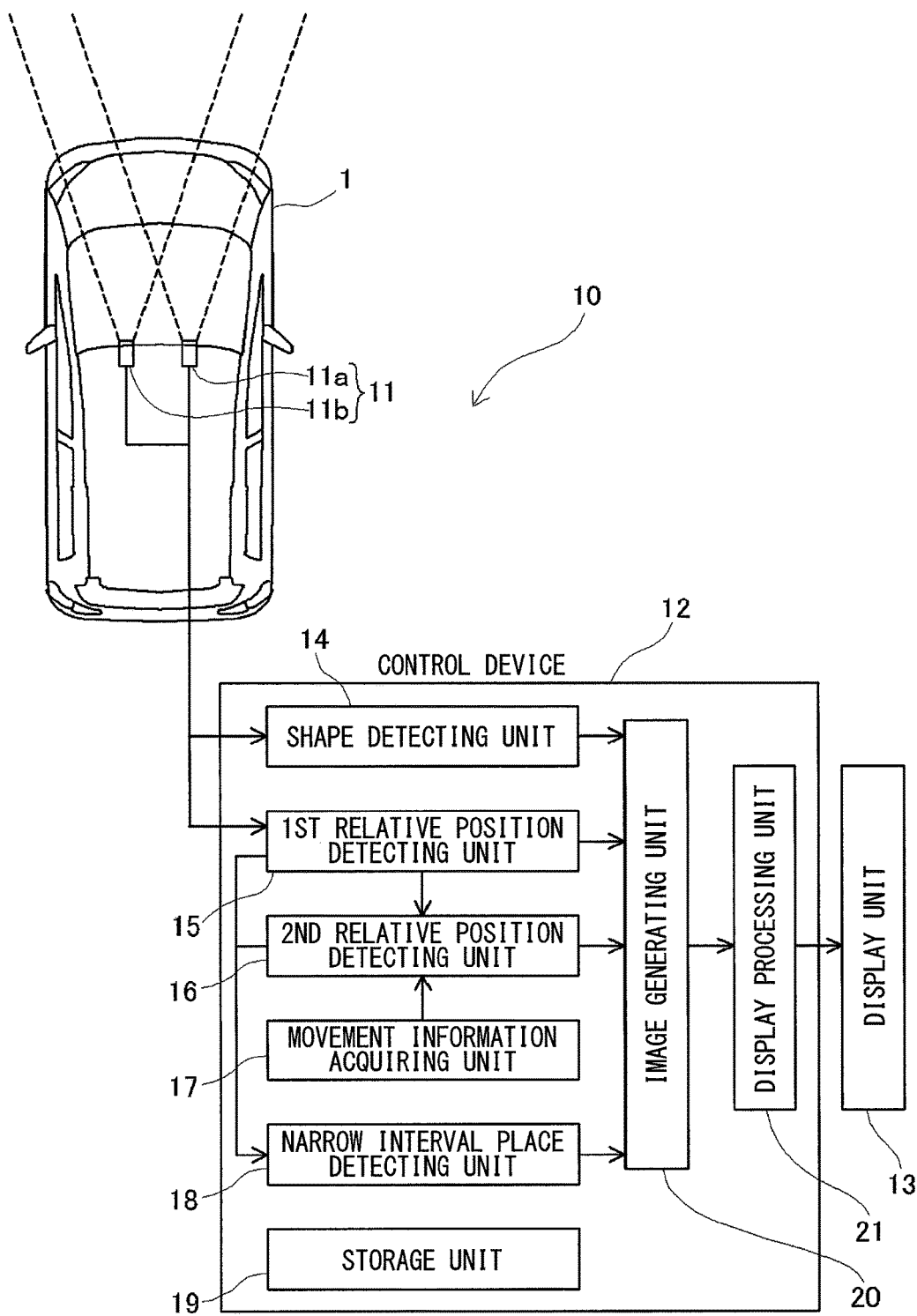
FIG. 1 is an explanatory view showing a configuration of a driving assistance device.

FIG. 1 shows a configuration of a driving assistance device 10 provided in a vehicle 1. The driving assistance device 10 of the present embodiment is provided with a stereo camera 11, and this stereo camera 11 is configured of two cameras 11a, 11b which are disposed side by side as directed to the front of the vehicle 1. Further, the driving assistance device 10 of the present embodiment is provided with a control device 12 for executing predetermined processing based on images photographed by the stereo camera 11, and a display unit 13 for displaying a result of the processing by the control device 12. Out of these, the control device 12 has a substrate mounted with a CPU, a memory, a variety of controllers, and the like, and installed on the rear side of an instrument panel in front of a driver's seat. Further, the display unit 13 includes a liquid crystal display installed on the instrument panel with a display screen directed to the driver's seat side, a head-up display for projecting display contents to a front glass (wind shield), and the like.

When the control device 12 is classified into function blocks having respective functions, the control device 12 is provided with: a shape detecting unit 14 for detecting a shape of an object (e.g., a guard rail, a wall, another vehicle, a curbstone, etc.) photographed by the stereo camera 11, and generating an image showing the object (hereinafter referred to as "object image"); a first relative position detecting unit 15 for detecting a relative position of the object to the vehicle 1 (hereinafter referred to as "first relative position") from the images photographed by the stereo camera 11; a movement information acquiring unit 17 for detecting movement information concerning a direction and an amount of movement of the vehicle 1; a second relative position detecting unit 16 for estimating a relative position of the object to the vehicle 1 after the object has been photographed by the stereo camera 11 based on the first relative position and the movement information ("relative position" in the present disclosure, and hereinafter referred to as "second relative position"); a narrow interval place detecting unit 18 for detecting a place in which an interval between the vehicle and the object is not longer than a distance D (e.g., 50 cm); a storage unit 19 for storing an own vehicle image showing the vehicle 1 (an external shape of the vehicle 1); an image generating unit 20 for generating an image showing conditions around the vehicle 1 viewed from above the vehicle 1 (top-view image); and a display processing unit 21 for displaying the top-view image generated by the image generating unit 20 on the display unit 13.

The cameras 11a, 11b constituting the stereo camera 11 corresponds to the "photographing device" in the present disclosure. The storage unit 19 corresponds to the "storage device" in the present disclosure. The shape detecting unit 14 and the first relative position detecting unit 15 correspond to the "object detecting device" in the present disclosure. The movement information acquiring unit 17 corresponds to the "movement information acquiring device" in the present disclosure. The second relative position detecting unit 16 corresponds to the "relative position estimating device" in the present disclosure. The narrow interval place detecting unit 18 corresponds to the "narrow interval place detecting device" in the present disclosure. The image generating unit 20 corresponds to the "image generating device" in the present disclosure. The display processing unit 21 corresponds to the "display device" in the present disclosure. Further, the shape detecting unit 14 also corresponds to the "object generating device" in the present disclosure.

Hereinafter, a description will be given of "positional relation display processing" which is performed by the driving assistance device 10 as described above. The positional relation display processing is processing for displaying, on the display unit 13, a top-view image showing the positional relation between the vehicle 1 and an object (conditions around the vehicle 1).

B. Positional Relation Display Processing

Figure 2A:
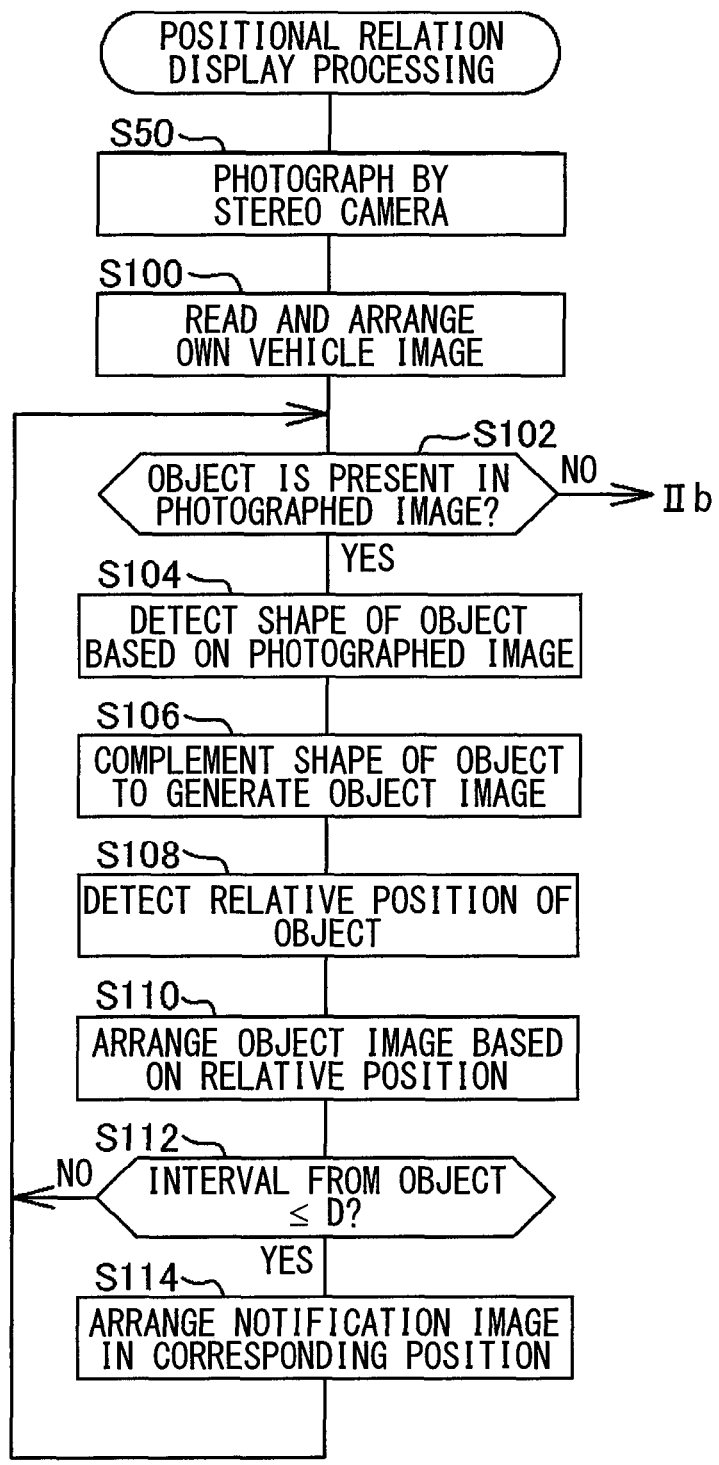
FIGS. 2A and 2B are flowcharts showing the first half of positional relation display processing which is executed by a control device.
Figure 2B:
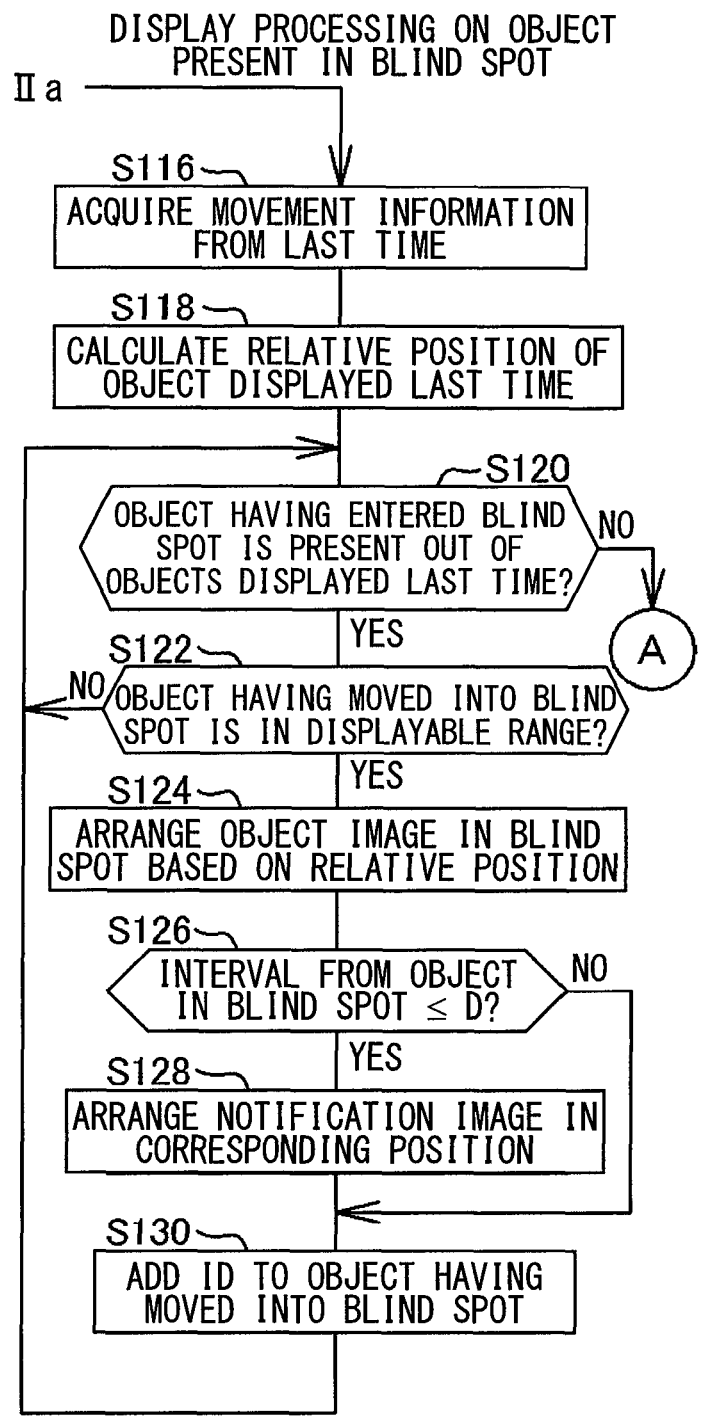
Figure 3:
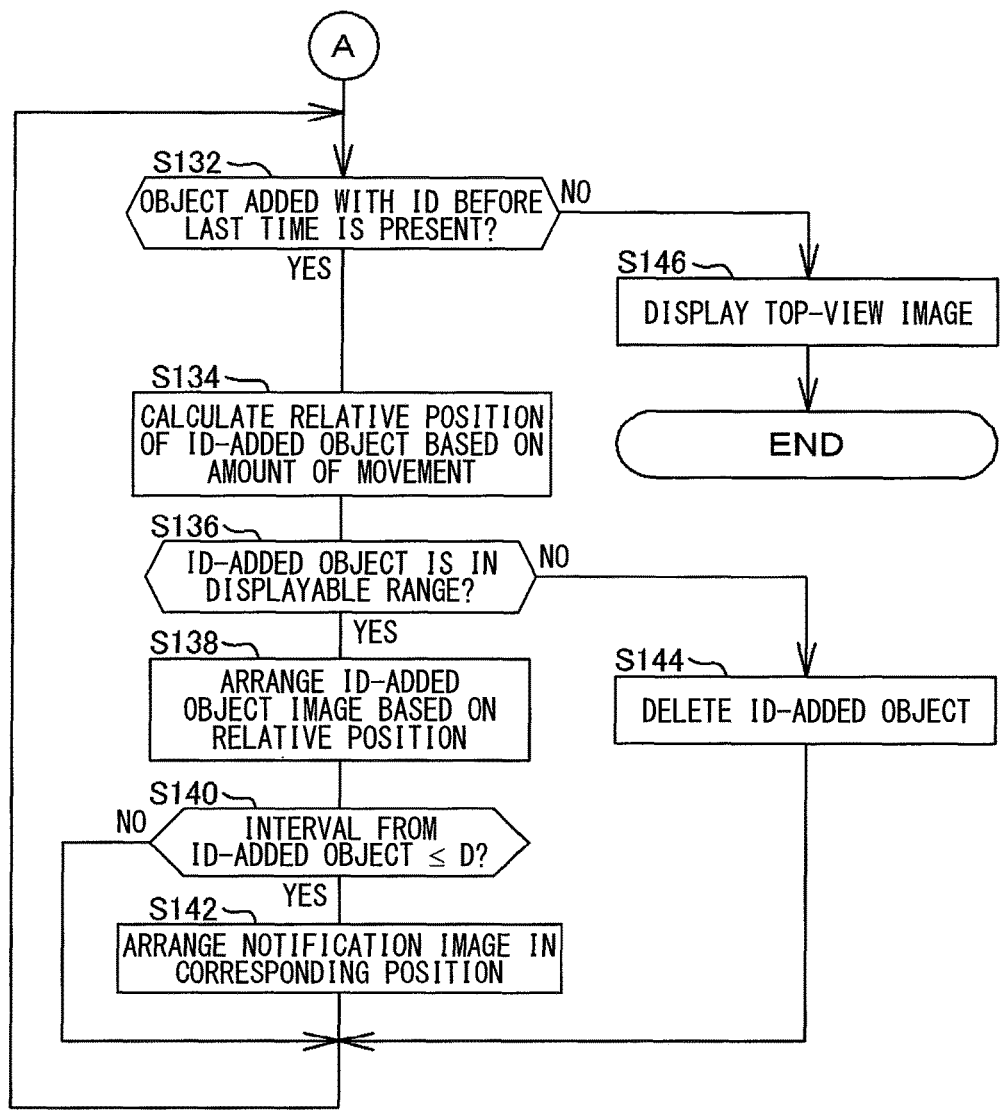
FIG. 3 is a flowchart showing the latter half of the positional relation display processing which is executed by the control device.

FIGS. 2A, 2B and 3 are flowcharts of the positional relation display processing that is performed in the driving assistance device 10 of the present embodiment. It is to be noted that the positional relation display processing is in effect performed by execution of a program stored in a ROM by the CPU inside the control device 12, but in the following, a description will be given taking the control device 12 or the foregoing functional blocks 14 to 19 as a main constituent for executing the program. Further, the positional relation display processing is performed as timer interruption processing (e.g., every 1/60 second).

When the positional relation display processing shown in FIGS. 2A, 2B and 3 is started, first, the control device 12 outputs a photographing instruction signal to the stereo camera 11 to make the stereo camera 11 photograph the front of the vehicle 1, and also acquires the photographed images (two photographed images simultaneously photographed by the cameras 11a, 11b). Subsequently, the image generating unit 20 of the control device 12 reads an own vehicle image from the storage unit 19, and arranges (stores) the own vehicle image in a display image area such as a frame buffer. The display image area is an area in which the top-view image to be displayed on the display unit 13 is generated (see S100, FIGS. 6A to 6C). Further, the own vehicle image is an image showing the vehicle 1 viewed from above. This own vehicle image is preferably an image (e.g., an image with a scale of 1 to 100) obtained by precisely reducing the external shape (including projections and depressions of a bumper) in the case of viewing the vehicle 1 from above. This is for displaying the interval between the vehicle 1 and the object on the display unit 13 with high accuracy.

When the image generating unit 20 arranges the own vehicle image in the display image area (S100), the control device 12 determines whether or not an object such as a guard rail, a wall, another vehicle, or a curbstone is present in the two photographed images acquired from the stereo camera 11 (S102). For example, shapes of a variety of objects are previously stored in the ROM in the control device 12 as a template, and it is determined whether or not there is present a portion in the photographed images which matches with the template (so-called template matching processing is performed).

It is to be noted that in this determination processing of S102, a "distant object (an object present in a position away from the vehicle 1 by a longer distance than a predetermined distance) is not to be detected (determined not to be present) even when it is present in the photographed images, and a "nearby object part (an object present in a position within the predetermined distance from the vehicle 1) is to be detected (determined to be present). For example, in the foregoing template matching processing, a smallish template (a template corresponding to the distant object) is not used, and it is determined whether or not an object matching with a largish template (a template corresponding to the nearby object) is present. Although a detail will be described later, in the driving assistance device 10 of the present embodiment, when an object is detected in the determination processing of S102, an object image showing this object is to be displayed on the display unit 13. Therefore, when the distant object unlikely to immediately contact the vehicle 1 is detected in the determination processing of S102, an object image showing this distant object is also displayed, and this may make it difficult for the driver to recognize an object image showing the nearby object which is likely to contact. For preventing this, in the determination processing of S102, the distant object is not to be detected.

Figure 4A:
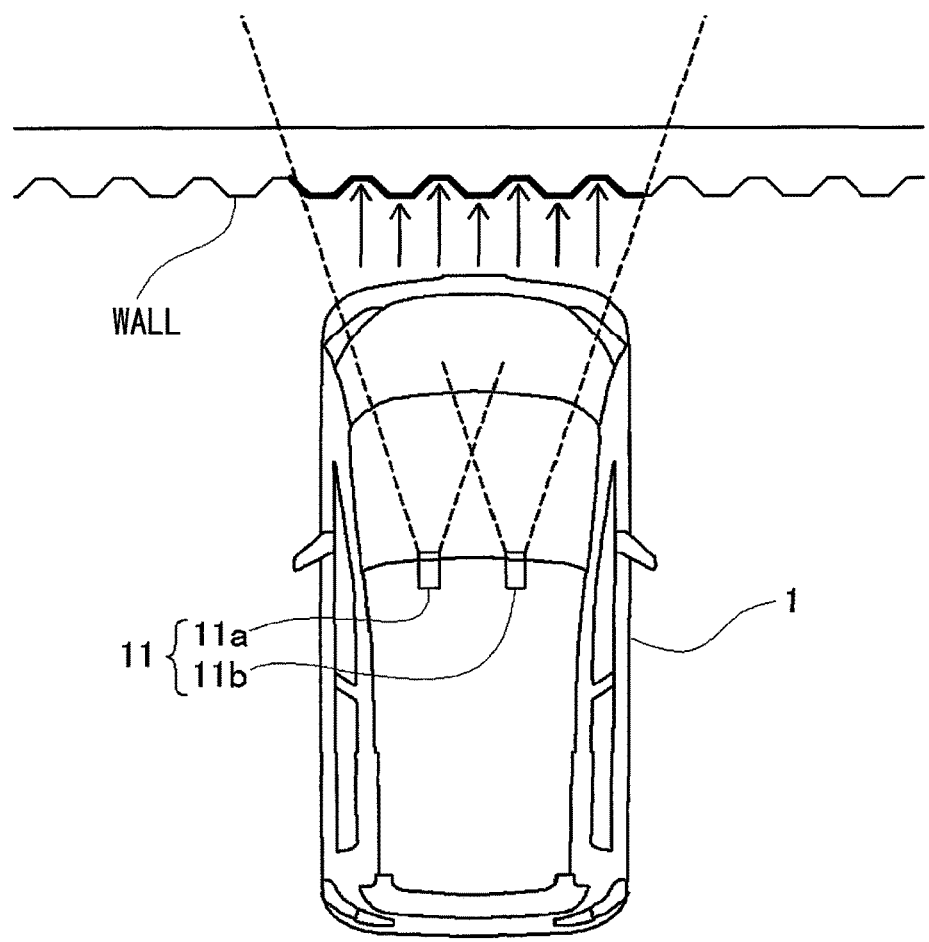
FIGS. 4A to 4C are explanatory views showing the state of generating an object image, where
Figure 4B:

When, as a result of the determination processing of S102, it is determined that an object (nearby object) is present in the photographed images (S102: yes), the shape detecting unit 14 of the control device 12 detects a shape of the object (S104). Here, as described above, the cameras 11a, 11b of the stereo camera 11 photograph the front of the vehicle 1 from different positions (in the state of having so-called parallax). This enables detection of a distance from the vehicle 1 to a predetermined place in the image based on a difference between the images photographed by the cameras 11a, 11b. Accordingly, as shown in FIG. 4A, first, the shape detecting unit 14 detects distances to a plurality of regions of the object (a wall with projections and depressions, here) detected in the processing of S102. That is, the distances from the vehicle 1 to the plurality of regions of the object may be different from one another, and hence the respective distances to the plurality of regions are detected. Then, based on those distances, the shape of the object on the vehicle 1 side when viewed from above is detected as shown in FIG. 4B (S104).

Figure 4C:
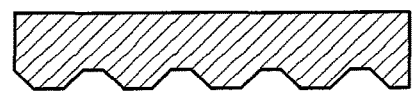

When the shape of the object on the vehicle 1 side is thus detected (S104), the shape of the other portion of the object is complemented, to generate an object image showing the object (S106). That is, in the processing of S104, only the shape of the object on the vehicle 1 side can be detected out of the shape of the object, and hence the shape of the other portion is complemented. For example, images (established images) of shapes corresponding to a variety of objects are previously stored in the storage unit 19. Then, based on the shape of the object on the vehicle 1 side, which has been detected in the processing of S104, a type of this object is estimated. Subsequently, the established image corresponding to the estimated object is read, and as shown in FIG. 4C, the shape of the object on the vehicle 1 side, which has been detected in S104, is reflected to (synthesized with) this established image, to generate an object image showing the detected object (S106).

It is to be noted that at the time of generating the object image, a scale of the object image is made the same as that of the own vehicle image. For example, when a scale of the own vehicle image is 1 to 100, an established image which also has the scale of 1 to 100 is previously stored. Then, before reflection of the shape of the object on the vehicle 1 side to the established image, a scale of the shape of the object on the vehicle 1 side is also set to 1 to 100.

When the object image is thus generated (S106), the first relative position detecting unit 15 of the control device 12 detects a relative position (first relative position) of the object to the vehicle 1 (S108). As described above, a distance from the vehicle 1 to a predetermined place in the image can be detected from images photographed by the stereo camera 11 (two images photographed by the cameras 11a, 11b), and hence a distance from the vehicle 1 to the object is detected here. Then, based on this distance, a first relative position of the object to the vehicle (e.g., two-dimensional coordinates with the center of the vehicle 1 taken as the origin) is detected. It is to be noted that the first relative position may be detected based on the "distances from the vehicle 1 to the plurality of regions of the object" detected in the processing of S104. Further, similarly to the object image, a scale of the first relative position detected in the processing of S108 is also set to 1 to 100.

Figure 5:
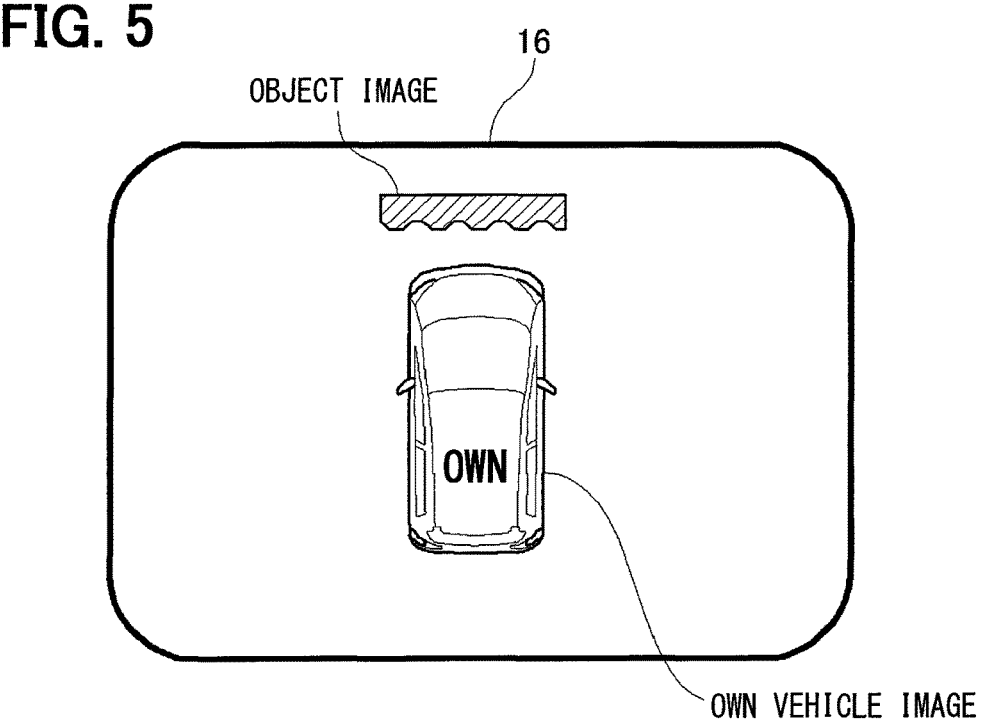
FIG. 5 is an explanatory view showing a state where an own-vehicle image and an object image are displayed on a display unit.

When the first relative position of the object is thus detected (S108) along with generation of the object image (S106), the image generating unit 20 arranges the object image in the displaying storage area based on the first relative position of the object (S110). That is, as shown in FIG. 5, the object image is arranged in the displaying storage area such that the object image is displayed in a "position corresponding to the first relative position" on the display screen of the display unit 13, with a "portion corresponding to the shape of the object on the vehicle 1 side" being directed to the own vehicle image side.

Figure 6:
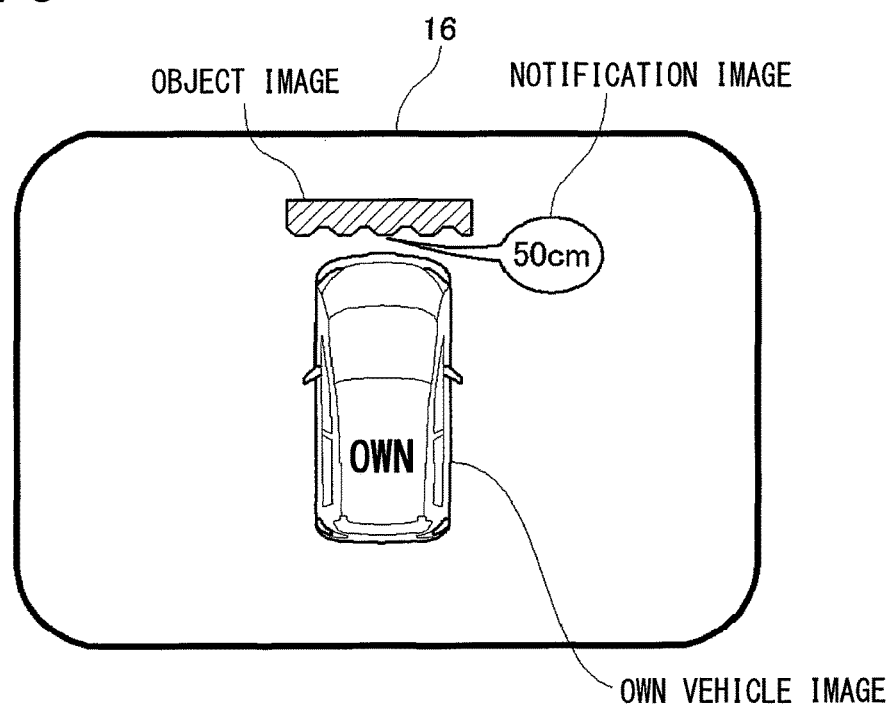
FIG. 6 is an explanatory view showing a state where a notification image is displayed on the display unit.

Subsequently, it is determined whether or not there is a place in which an interval between the object and the vehicle 1 is not longer than a predetermined distance D (e.g., 50 cm) (hereinafter referred to as "narrow interval place") (S112). In this determination processing, it may be determined whether or not there is a place in which an interval between the object image and the own vehicle image on the displaying storage area (on the display screen) is not longer than a "distance obtained by setting a scale of the distance D to 1 to 100 (e.g., 5 mm)". Alternatively, a distance from the vehicle 1 to each region of the object may be detected based on the images photographed by the stereo camera 11 and it may be determined whether or not there is a place with the distance being not longer than the distance D. When, as a result, there is a place in which the interval between the object and the vehicle 1 is not longer than the predetermined distance D (narrow interval place) (S112: yes), the image generating unit 20 arranges, in the displaying storage area, a "notification image for notifying the interval (50 cm, here) between the object and the vehicle 1" based on the position of the narrow interval place. That is, as shown in FIGS. 6A and 6B, a notification image is arranged in the displaying storage area such that the notification image is displayed in a position corresponding to the narrow interval place (a position on the display screen of the display unit 13).

Thereafter, the processing returns to S102, and it is determined whether or not another object is present in the images photographed by the stereo camera 11. When another object is present (S102: yes), the foregoing processing of S104 to S114 is repeated. That is, for each object present in the images photographed by the stereo camera 11, a first relative position is detected while an object image is generated, and the object image is arranged in the displaying storage area such that the object image is displayed in a position corresponding to the first relative position. Further, when a narrow interval place is present, a notification image is arranged in the displaying storage area such that the notification image is displayed in a position corresponding to the narrow interval place.

Figure 7A:
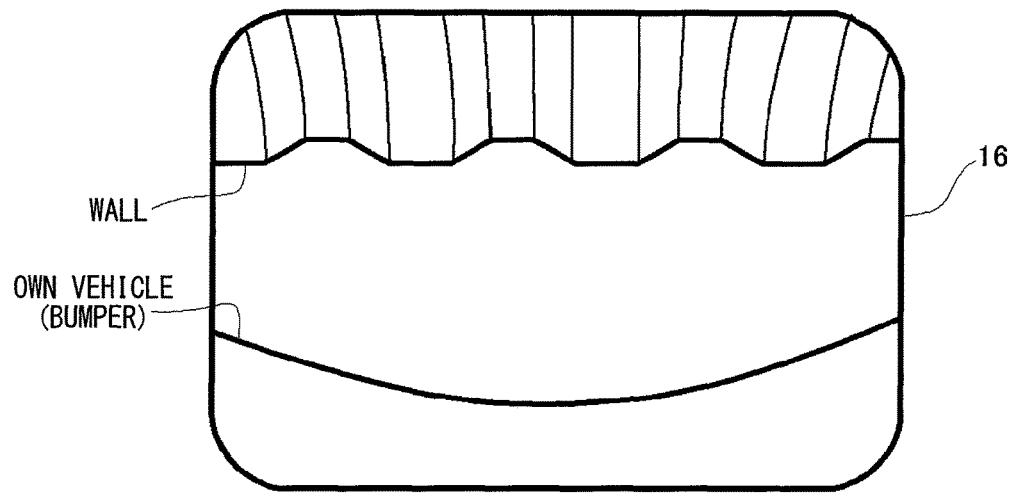
FIGS. 7A and 7B are explanatory views illustrating conventional arts of displaying a photographed image, where
Figure 7B:
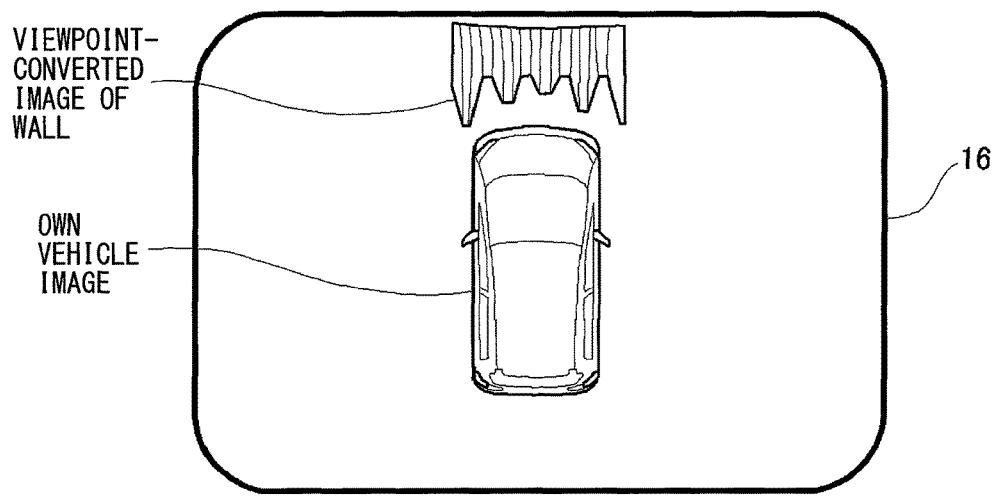

Herein, the driving assistance device 10 of the present embodiment is compared with conventional arts. FIG. 7A shows a conventional art of displaying an image, photographed by a camera installed in the vehicle, on a display unit as it is. In such a conventional art, as shown in FIG. 7A, the image blurs or the vicinity of the vehicle (bumper, here) in the image is distorted depending on performance of the camera, which makes it difficult for the driver to recognize the positional relation between the vehicle and the object. Further, while the positional relation between the vehicle and the object is easier to recognize when viewed from above the vehicle, the camera cannot be attached above the vehicle, leading to display of an image which is different from the image viewed from above the vehicle and is difficult to recognize. Further, FIG. 7B shows a conventional art of converting the image photographed by the camera provided in the vehicle to an image viewed from above the vehicle (viewpoint conversion) and displaying the converted image on the display unit. In such a conventional art, as shown in FIG. 7B, the image viewed from above the vehicle can be displayed. However, when the photographed image (the image of the wall, here) is subjected to viewpoint conversion, the image is distorted, which makes it difficult for the driver to recognize the positional relation between the vehicle and the object (e.g., an interval between the vehicle and the wall).

In contrast to these conventional arts, as described above using FIG. 5, the driving assistance device 10 of the present embodiment displays an own vehicle image viewed from above the vehicle 1 and also displays an object image obtained by viewing the object from above in a position corresponding to a relative position (first relative position) of the object to the vehicle 1. Hence it is possible to display the own vehicle image and the object image in the view from above, which facilitates the driver to recognize the positional relation between the vehicle 1 and the object. Further, since no distortion occurs in the own vehicle image and the object image, the positional relation between the vehicle and the object (e.g., the interval between the vehicle and the object) can be displayed with high accuracy.

Moreover, since the driving assistance device 10 of the present embodiment detects the shape of the object on the vehicle 1 side and displays the object image to which the detected shape has been reflected, the driving assistance device 10 can display with high accuracy the shape of the object on the vehicle 1 side in the case of viewing the object from above, and can further display with high accuracy the interval between the object and the vehicle 1.

Furthermore, as described above using FIG. 1, the driving assistance device 10 of the present embodiment is provided with the stereo camera 11 (cameras 11a, 11b), and detects a distance from the vehicle 1 to the object based on a difference between two images photographed by the stereo camera 11. Hence it is possible to detect with high accuracy the relative position of the object to the vehicle 1 and the shape of the object on the vehicle 1 side, and further possible to display with high accuracy the positional relation between the vehicle and the object and the shape of the object on the vehicle 1 side.

Moreover, as described above using FIGS. 6A and 6B, when there is a place (narrow interval place) in which the interval between the object and the vehicle 1 is not longer than the predetermined distance D, the driving assistance device 10 of the present embodiment displays a notification image for notifying the interval between the object and the vehicle 1 in a position corresponding to the above place (a position on the display screen of the display unit 13). Hence it is possible to notify the approach of the vehicle 1 to the object in such an aspect as to facilitate the driver to recognize the narrow interval place.

In the above, the description has been given of the processing (S104 to S114) for displaying the object image showing the object photographed by the stereo camera 11 on the display unit 13 in the driving assistance device 10 of the present embodiment. In contrast, when all object images showing objects photographed by the stereo camera 11 are displayed or when an image of an object is not photographed by the stereo camera 11 (S102: no), processing is performed for displaying an object image showing an object present in a blind spot of the stereo camera 11 (outside a photographable range of the stereo camera 11). In this processing, first, the movement information acquiring unit 17 acquires movement information (a direction and an amount of movement) of the vehicle 1 after the object image was displayed (arranged) in the positional relation display processing last time (FIGS. 2A, 2B and 3) (S116). For example, from a "system for detecting a steering angle and a steering speed of the vehicle 1", which is different from the driving assistance device 10, these pieces of information (so-called CAN information) are received, and the upper movement is acquired based on these pieces of information. It is to be noted that in the following, the positional relation display processing last time (FIGS. 2A, 2B and 3) is simply expressed as "last time", and the positional relation display processing this time is simply expressed as "this time".

When the movement information of the vehicle 1 after the object image was displayed last time is thus detected (S116), a relative position this time (a relative position after the vehicle 1 has moved, a second relative position) concerning each of all the objects displayed last time is calculated (estimated) (S118). This arithmetic processing is performed based on the "relative position (first relative position) of the object when the object image was displayed last time" and the "movement information of the vehicle 1 after the object image was displayed last time". For example, the movement information of the vehicle 1 is reflected to two-dimensional coordinates indicating the first relative position, to calculate the relative position this time (second relative position). When the relative position this time (second relative position) concerning each of all the objects displayed last time is thus calculated (S118), it is determined whether or not there is present an "object whose relative position this time (second relative position) is located in the blind spot of the stereo camera 11" (S120). That is, it is determined whether or not there is present an object having entered the blind spot of the stereo camera 11 out of the objects corresponding to the object images displayed last time.

When, as a result, the object having entered the blind spot of the stereo camera 11 is present (S120: yes), it is determined whether or not the relative position (second relative position) of the object is in a range in which the object image is displayable (S122). That is, since there is naturally a limit on the display area of the display unit 16, the range of the relative position (second relative position) in which the object (object image) is displayable is accordingly within a predetermined range (e.g., longitudinally within 2 m and laterally within 3 m from the vehicle 1). Therefore in the determination processing of S122, it is determined whether or not the relative position (second relative position) of the object having entered the blind spot of the stereo camera 11 is present within this predetermined range (within the displayable range).

When, as a result, the relative position (second relative position) of the object having entered the blind spot of the stereo camera 11 is present within the displayable range (S122: yes), the image generating unit 20 arranges the object image (object image displayed last time) in the displaying storage area such that the object image is displayed in a position corresponding to the relative position (second relative position) on the display screen (S124).

Figure 8A:
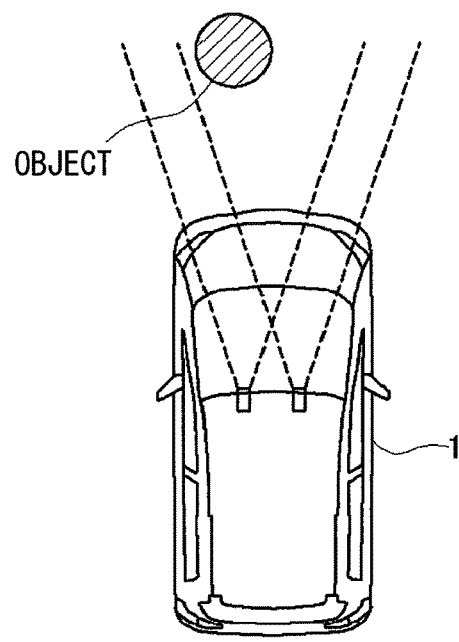
FIGS. 8A and 8B are explanatory views showing a state where an object enters a blind spot.
Figure 8B:
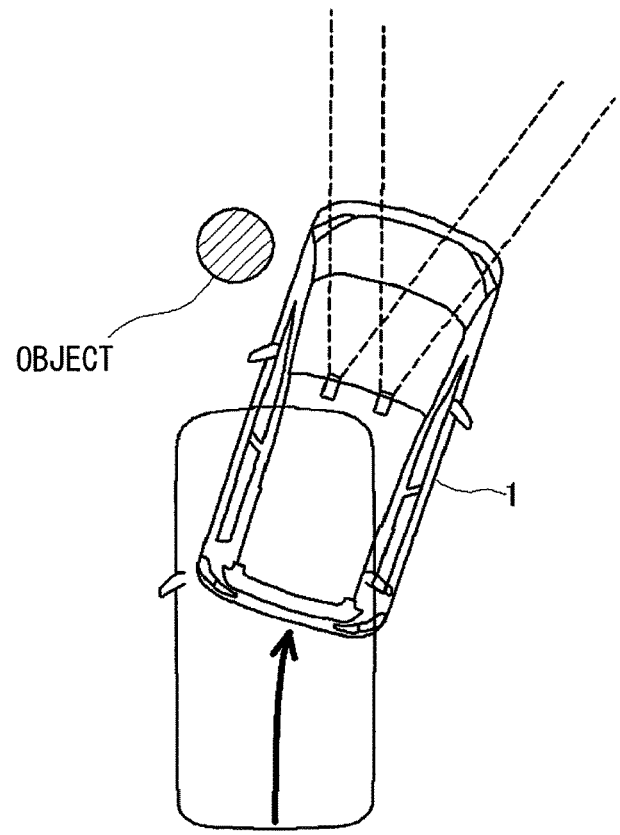
Figures 9, 10:
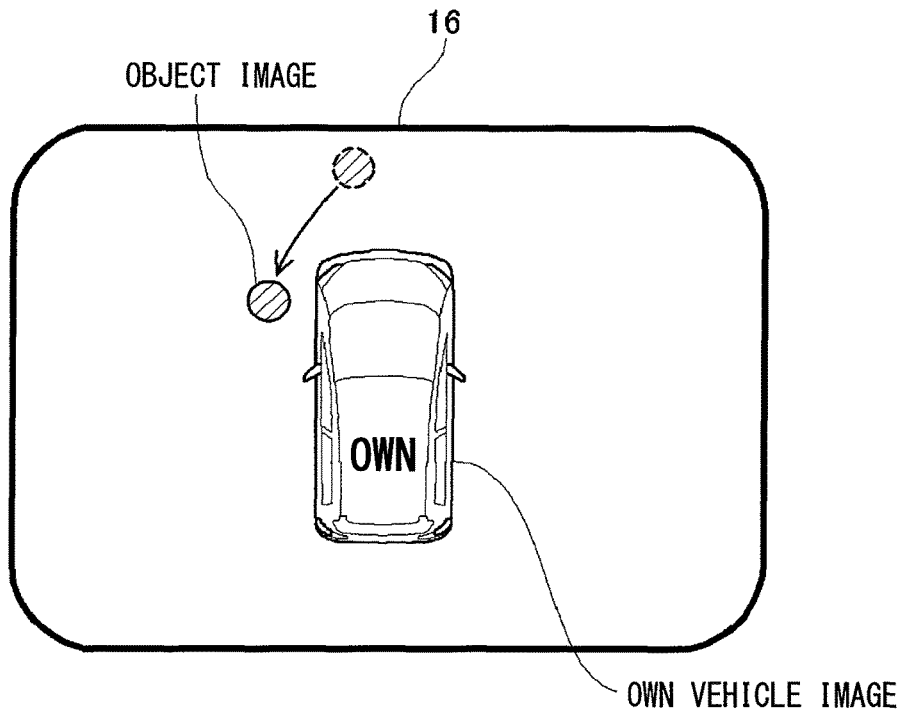
FIG. 9 is an explanatory view showing a state where an own vehicle image and an object image are displayed on the display unit at the time of the object entering the blind spot.
FIG. 10 is an explanatory view schematically showing a blind-spot object database.

FIGS. 8A and 8B show a state where an object enters the blind spot of the stereo camera 11, and FIG. 9 shows display contents of the display unit 16 at that time. It is to be noted that in FIGS. 8A, 8B and 9, the object and the object image are simplified and shown (in a circular form).

By performing the foregoing processing of S116 to S124, even when the object enters a non-photographable range (blind spot) of the stereo camera 11 from the photographable range thereof as shown in FIGS. 8A and 8B, the driving assistance device 10 of the present embodiment can calculate a "relative position this time (second relative position) of the object" based on the "relative position (first relative position) of the object when the object image was displayed last time" and the "movement information of the vehicle 1 after the object image was displayed last time", to display the object image of the object in a position corresponding to the obtained relative position (second relative position) (FIG. 9). Hence, even when the object enters the blind spot of the stereo camera 11 by movement of the vehicle 1 after the object has been photographed, it is possible to display the positional relation between the vehicle 1 and the object with high accuracy.

When the object image showing the object which has entered the blind spot of the stereo camera 11 is thus displayed (S124), it is determined whether or not there is a place (narrow interval place) in which an interval between the vehicle 1 and the object having entered the blind spot is not longer than the predetermined distance D (e.g., 50 cm) (S126). In this determination processing, for example, it is determined whether or not there is a place in which an interval between the object image having entered the blind spot and the own vehicle image on the displaying storage area (on the display screen) is not longer than the "distance obtained by setting the scale of the distance D to 1 to 100 (e.g., 5 mm)". When, as a result, there is a place in which the interval between the object having entered the blind spot and the vehicle 1 is not longer than the predetermined distance D (narrow interval place) (S126: yes), the image generating unit 20 arranges a notification image in the displaying storage area such that the notification image is displayed in a position corresponding to the narrow interval place (a position on the display screen of the display unit 13) (S128). In this manner, it is possible to notify the approach of the vehicle 1 to the object having entered the blind spot in such an aspect as to facilitate the driver to recognize the narrow interval place.

When the object image showing the object which has entered the blind spot of the stereo camera 11 is displayed (S124), identification information (ID) is further added in association with the object image and the relative position (second relative position) of this object (S130).

FIG. 10 shows a blind-spot object database in the driving assistance device 10 of the present embodiment. The blind-spot object database is a database for the control device 12 to store an object whose object image is on display out of objects having entered the blind spot. This database is stored in the storage unit 19. That is, even when an object moves into the blind spot, so long as an object image showing the object is displayed, the object image (shape) and a relative position of the object need to be stored. Accordingly, when an object enters the blind spot, an ID is added to an object image and a relative position of the object, and then stored.

When the processing of S120 to S130 is thus performed, the processing returns to S120, and it is determined whether or not the other object having entered the blind spot is present. When, as a result, the other object having entered the blind spot is present (S120: yes), the foregoing processing of S120 to S130 is repeated. That is, when a relative position this time (second relative position) is calculated for each object having entered the blind spot and the relative position (second relative position) is in the displayable range, the object image is arranged in the displaying storage area such that the object image is displayed in a position corresponding to the relative position (second relative position), and an ID is added to the object having entered the blind spot (the object image and the relative position of the object) and stored into the blind-spot object database. Further, when there is present a place in which the interval between the object having entered the blind spot and the vehicle 1 is not longer than the predetermined distance D (narrow interval place), a notification image is arranged in the displaying storage area such that the notification image is displayed in a position corresponding to the narrow interval place.

In the above, the description has been given of the processing (S116 to S130) for displaying an object image showing an object when the object enters the blind spot of the stereo camera 11 from this time. In contrast, when an object entered the blind spot of the stereo camera 11 before the last time, processing is performed as follows. The control device 12 first determines whether or not an object image showing an object which has entered the blind spot of the stereo camera 11 before the last time is displayed (S132). That is, when an object image showing an object which has entered the blind spot before the last time is displayed, it is stored in the blind-spot object database described above using FIG. 10 (it is stored in the processing of S130 before the last time, and hence the determination processing of S132 is performed by determining whether or not there is an object (object image and relative position) whose ID is added and stored into the blind-spot object database before the last time. It is to be noted that, since an object having entered the blind spot before the last time has been added with an ID as described above, the object is expressed as an "ID-added object".

When, as a result of the determination processing of S132, it is determined that an ID-added object is present (S132: yes), a relative position this time of the ID-added object is calculated based on the relative position last time of the ID-added object (the relative position stored in the blind-spot object database) and the movement information of the vehicle 1 detected in the processing of S116 (the movement information of the vehicle 1 after the object image was displayed last time) (S134). For example, the movement information of the vehicle 1 is reflected to two-dimensional coordinates indicating the relative position last time of the ID-added object, to calculate a relative position this time.

When the relative position this time of the ID-added object is thus detected (S134), it is determined whether or not the relative position is in a range in which the object image is displayable (S136). That is, as described above, since there is a limit on the display area of the display unit 16, the range of the relative position in which the object (object image) is displayable is accordingly within a predetermined range (e.g., longitudinally within 2 m and laterally within 3 m from the vehicle 1). Therefore in the determination processing of S136, it is determined whether or not a relative position of the ID-added object is present within this predetermined range (within the displayable range).

When, as a result, the relative position of the ID-added object is in the displayable range (S136: yes), the image generating unit 20 arranges the object image corresponding to the ID (the object image stored in the blind-spot object database) such that the object image is displayed in a position corresponding to the relative position on the display screen (S138). It is to be noted that, when the object image showing the ID-added object is arranged, the relative position corresponding to the ID in the blind-spot object database is updated to the relative position calculated in the processing of S134.

When the object image showing the ID-added object is thus displayed (S138), it is determined whether or not there is a place in which an interval between the ID-added object and the vehicle 1 is not longer than the predetermined distance D (e.g., 50 cm) (narrow interval place) (S140). In this determination processing, for example, it is determined whether or not there is a place in which an interval between the ID-added object image and the own vehicle image on the displaying storage area (on the display screen) is not longer than the "distance obtained by setting the scale of the distance D to 1 to 100 (e.g., 5 mm)". When, as a result, there is a place in which the interval between the ID-added object and the vehicle 1 is not longer than the predetermined distance D (narrow interval place) (S140: yes), the image generating unit 20 arranges a notification image in the displaying storage area such that the notification image for notifying the interval between the object and the vehicle 1 is displayed in a position corresponding to the narrow interval place (a position on the display screen of the display unit 13) (S142). In this manner, it is possible to notify the approach of the vehicle 1 to the object (ID-added object) having entered the blind spot before the last time in such an aspect as to facilitate the driver to recognize the narrow interval place.

In contrast, when the relative position of the ID-added object is not within the displayable range in the determination processing of S136 (S136: no), the object image showing the ID-added object cannot be displayed, and hence the object (ID and ID-added object image and relative position) is deleted from the blind-spot object database while the processing of S138 to S142 is omitted (S144).

When the processing of S132 to S144 is thus performed, the processing returns to S132, and it is determined whether or not another ID-added object is present. That is, it is determined whether or not another ID-added object (ID and ID-added object image and relative position) is stored in the blind-spot object database. When, as a result, another ID-added object is present (S132: yes), the foregoing processing of S134 to S144 is repeated. That is, when a relative position this time is calculated for each ID-added object and the relative position is in the displayable range, the object image is arranged in the displaying storage area such that the object image is displayed in a position corresponding to the relative position on the display screen. In contrast, when the relative position is not in the displayable range, the object image is not arranged and it is deleted from the blind-spot object database. Further, when there is present a place in which the interval between the object having entered the blind spot before the last time and the vehicle 1 is not longer than the predetermined distance D (narrow interval place), a notification image is arranged in the displaying storage area such that the notification image is displayed in a position corresponding to the narrow interval place. When the processing of S134 to S144 is performed on all of the ID-added objects, the display processing unit 21 displays on the display unit 13 the contents of the image display area (the variety of images arranged on the image display area in the processing of S110, S114, S124, S128, S138, S142, namely a top-view image) (S146). Thereafter, the positional relation display processing shown in FIGS. 2A, 2B and 3 is completed.

As described above, in the driving assistance device 10 of the present embodiment, also as for the object having entered the blind spot before the last time (ID-added object), the relative position of the object is updated and the object image is displayed based on this relative position. Accordingly, even after the object has entered the blind spot, the positional relation between the vehicle 1 and the object can be continuously displayed with high accuracy so long as the object is present in the displayable range.

Although the driving assistance device of the embodiment has been described above, the present disclosure is not restricted to the above embodiment, and can be carried out in a variety of aspects in the range not deviating from the gist of the disclosure.

For example, in the foregoing embodiment, when there is present a place in which the interval between the object and the vehicle 1 is not longer than the predetermined distance D (narrow interval place), a notification image is to be displayed in a position corresponding to the place on the display screen. This is not restrictive, and when there is present a place in which the interval between the object and the vehicle 1 is not longer than the predetermined distance D, a range corresponding to the place on the display screen may be enlarged and displayed (so-called zoom-up display), or a color of the range may be changed. In this manner, it is possible to notify the driver of the approach of vehicle 1 to the object in a more emphasized manner.

Further, in the foregoing embodiment, when there is present a place in which the interval between the vehicle 1 and the object is not longer than the predetermined distance D, information indicative of this may be transmitted to a brake control system. Then, the brake control system having received this information may automatically apply a brake (even without operation by the driver). In this manner, it is possible to notify the driver of the approach of the vehicle 1 to the object in a more emphasized manner, and also possible to prevent the vehicle 1 from contacting the object.

Further, in the foregoing embodiment, the displayable range of the display unit 13 may be changed in accordance with a speed of the vehicle 1. For example, when the vehicle 1 is traveling at a speed not lower than 10 km/h, an object present longitudinally within 20 m and laterally within 10 m from the vehicle 1 may be displayed on the display unit 16. When the vehicle 1 is traveling at a speed lower than 10 km/h, an object present longitudinally within 2 m and laterally within 3 m from the vehicle 1 may be displayed on the display unit 16.

Moreover, in the foregoing embodiment, after the image generating unit 20 has arranged all of the object images and the notification images in the displaying storage area, the contents of the displaying storage area (the top-view image) are to be displayed on the display unit 13. However, every time the image generating unit 20 arranges the object image or the notification image in the displaying storage area, the contents of the displaying storage area (the top-view image) may be displayed on the display unit 13.

Moreover, the own vehicle image and the object image may only be images to which the external shapes of the vehicle 1 and the object are reflected, and the external shapes are not required to be displayed as they are. For example, a size of a symbol mark viewed from above the vehicle 1 may be appropriately enlarged or reduced and displayed corresponding to the external shape of the vehicle 1.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A driving assistance device mounted on a vehicle and displaying a condition around the vehicle on a display unit, the driving assistance device comprising:
   a storage device that stores an external shape of the vehicle;
   an object detection device that detects a position of an object disposed around the vehicle and an external shape of only a vehicle-facing side of the object;
   a movement information acquiring device that acquires movement information relating to a direction and an amount of movement of the vehicle;
   a relative position estimating device that estimates a relative position of the object to the vehicle based on the position of the object acquired in the object detecting device and the movement information acquired in the movement information acquiring device;
   an image generating device that generates a top-view image of the vehicle and the object viewed from above the vehicle based on the external shape of the vehicle, the external shape of only the vehicle-facing side of the object, and the relative position of only the vehicle-facing side of the object to the vehicle;
   a display device that displays the top-view image on the display unit; and
   an object generating device that generates an object image indicative of the external shape of the object based on the external shape of the object detected in the object detecting device, wherein:
   the storage device stores a vehicle image indicative of the external shape of the vehicle; and
   the image generating device generates the top-view image including the object image and the vehicle image.

2. The driving assistance device according to claim 1, further comprising:
   a narrow interval place detecting device that detects a narrow interval place, in which an interval between the vehicle and the object is equal to or smaller than a predetermined distance, based on the relative position of the object to the vehicle, the external shape of the vehicle, and the external shape of the object, wherein:
   the image generating device generates the top-view image indicative of the narrow interval place when the narrow interval place is detected.

3. The driving assistance device according to claim 1, further comprising:
   a plurality of photographing devices that photograph the object from different positions, wherein:
   the object detecting device detects the position of the object disposed around the vehicle and the external shape of the vehicle-facing side of the object.

4. A driving assistance method provided in a vehicle for displaying a condition around the vehicle on a display unit, the driving assistance method comprising:
   detecting a position of an object disposed around the vehicle, and an external shape of only a vehicle-facing side of the object;
   acquiring movement information relating to a direction and an amount of movement of the vehicle;
   estimating a relative position of the object to the vehicle based on the position of the object and the movement information;
   generating a top-view image of the vehicle and the object viewed from above the vehicle based on an external shape of the vehicle, the external shape of only the vehicle-facing side of the object, and the relative position of only the vehicle-facing side of the object to the vehicle;
   displaying the top-view image on the display unit;
   generating an object image indicative of the external shape of the object based on the external shape of the object; and
   storing a vehicle image indicative of the external shape of the vehicle, wherein:
   the top-view image of the vehicle and the object includes the object image and the vehicle image.

* * * * *